US009876778B2

(12) United States Patent
Smith et al.

(10) Patent No.: US 9,876,778 B2
(45) Date of Patent: Jan. 23, 2018

(54) DEVICES FOR PROVIDING SECURE REMOTE ACCESS

(71) Applicant: Control4 Corporation, Salt Lake City, UT (US)

(72) Inventors: Wallace Eric Smith, Pleasant Grove, UT (US); David Paul Fay, Salt Lake City, UT (US); Erik Frederick, Durham, NC (US); William Richard Clark, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 0 days.

(21) Appl. No.: 14/666,030

(22) Filed: Mar. 23, 2015

(65) Prior Publication Data

US 2016/0285874 A1    Sep. 29, 2016

(51) Int. Cl.
*H04L 29/06* (2006.01)
*H04L 29/08* (2006.01)
*H04L 29/12* (2006.01)

(52) U.S. Cl.
CPC ...... *H04L 63/0823* (2013.01); *H04L 61/2589* (2013.01); *H04L 63/0807* (2013.01); *H04L 63/107* (2013.01); *H04L 67/125* (2013.01); *H04L 67/141* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 2008/0048861 A1* | 2/2008 | Naidoo | G08B 13/19669 340/541 |
| 2009/0154678 A1* | 6/2009 | Kewin | H04M 3/493 379/201.01 |
| 2011/0145397 A1* | 6/2011 | Burns | H04L 29/1249 709/224 |
| 2013/0183900 A1* | 7/2013 | Lee | H04W 84/20 455/41.2 |
| 2015/0058447 A1* | 2/2015 | Albisu | H04L 67/02 709/219 |
| 2015/0350186 A1* | 12/2015 | Chan | H04L 63/083 726/9 |

* cited by examiner

*Primary Examiner* — Hadi S Armouche
*Assistant Examiner* — Andrew J Steinle
(74) *Attorney, Agent, or Firm* — Austin Rapp

(57) ABSTRACT

A method for providing secure remote access by a controller is described. The method includes establishing a link through a security service to a client device via a cloud server based on a security token from the client device. The method also includes receiving a command message from the client device for an application program interface (API) located within the controller. The command message is forwarded by the cloud server. The method further includes producing an automation command based on the command message. The API interprets the command message.

26 Claims, 6 Drawing Sheets

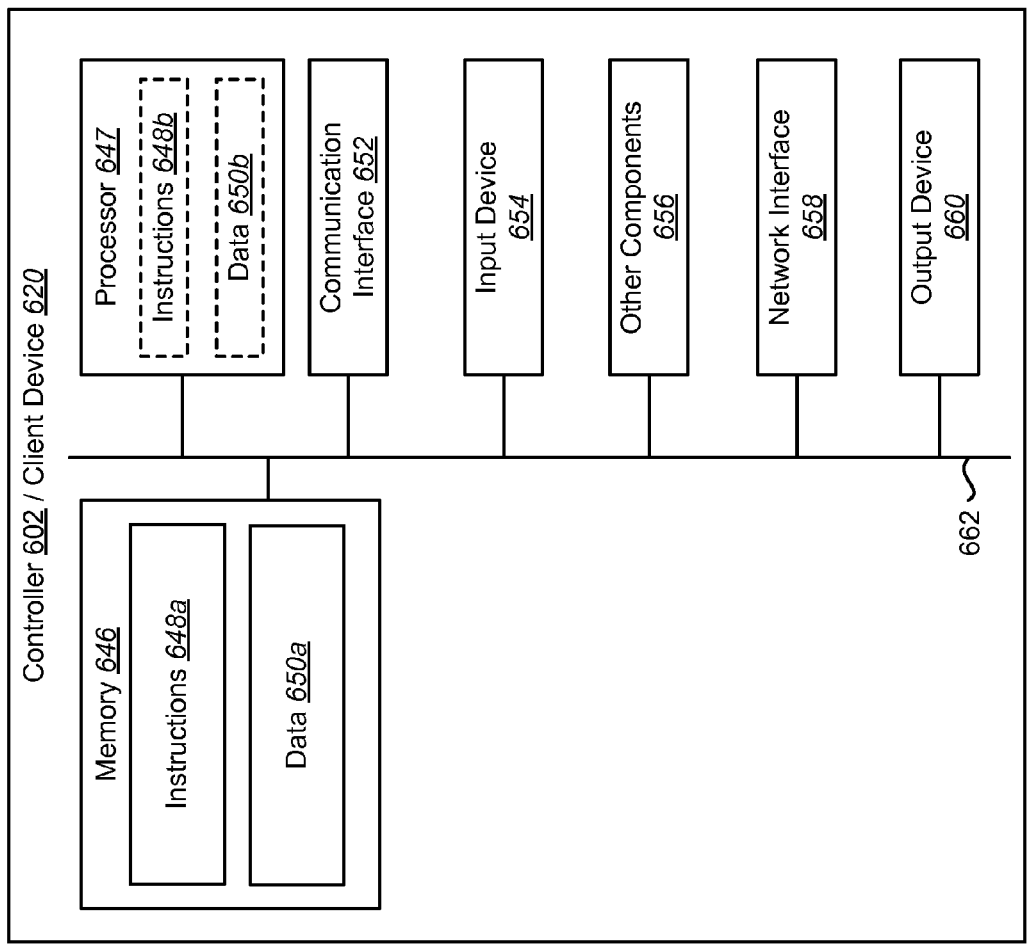

DEVICES FOR PROVIDING SECURE REMOTE ACCESS

TECHNICAL FIELD

The present disclosure relates generally to electronic devices. More specifically, the present disclosure relates to devices for providing secure remote access.

BACKGROUND

In recent years, the price of electronic devices has decreased dramatically. In addition, the types of electronic devices that can be purchased have continued to increase. For example, DVD players, large screen TVs, multi-carousel CD and DVD players, MP3 players, video game consoles and similar consumer electronic items have become more widely available while continuing to drop in price.

The decreasing prices and increasing types of electronic components have packed today's homes and businesses with modern conveniences. Typical homes and businesses now include more electronic devices than ever before. While these electronic devices may provide convenience and entertainment, many also require control. Moreover, these electronic devices consume electrical power and may consume other resources. The ever-increasing cost of resources, such as electricity, may be a concern.

Some electronic devices communicate with other electronic devices over a network. However, some difficulties arise in the context of network communications. For example, security and ease of setup and use may be problematic. As illustrated by this discussion, devices that improve communication security and ease of setup and use may be beneficial.

BRIEF DESCRIPTION OF THE DRAWINGS

FIG. 6 is a block diagram illustrating various components that may be utilized in a controller and/or a cloud server.

DETAILED DESCRIPTION

Figure 1:
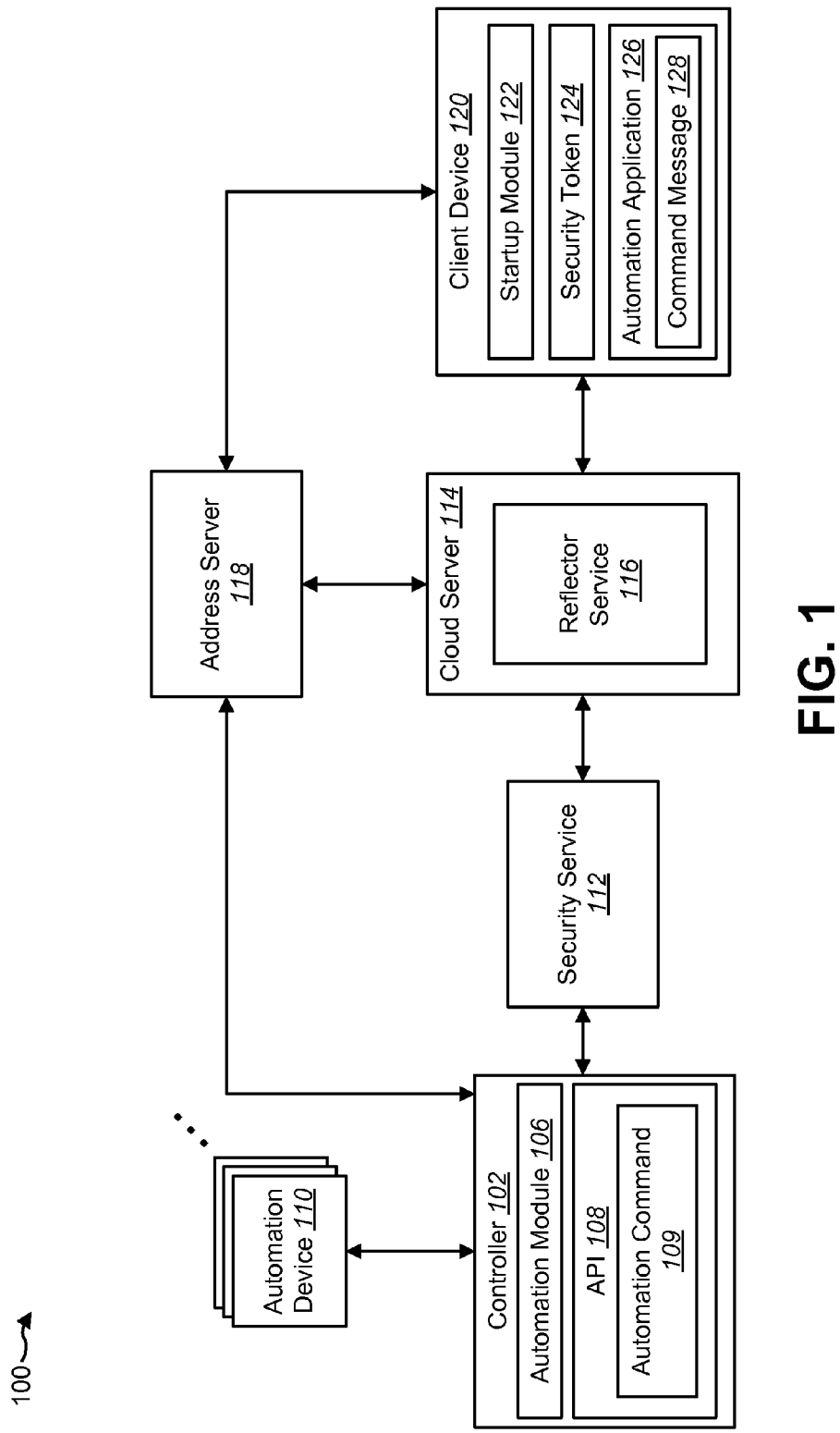
FIG. 1 is a block diagram of a system for providing secure remote access by a controller, a cloud server and a client device.

A method for providing secure remote access by a controller is described. The method includes establishing a link through a security service to a client device via a cloud server based on a security token from the client device. The method also includes receiving a command message from the client device for an application program interface (API) located within the controller. The command message is forwarded by the cloud server. The method further includes producing an automation command based on the command message. The API interprets the command message.

Establishing the link through the security service to the client device may include receiving a JSON Web Token (JWT) sent by the client device and forwarded by the cloud server. The cloud server may forward the command message to the controller using a reflector service. The reflector service may be Representational State Transfer (REST) forwarder. The cloud server may validate the security token and create a session for the client device and the controller.

The method may also include receiving the security token from the client device via the cloud server, and executing the API upon validating the security token. The automation command may include one or more configuration settings that affect one or more controlled automation devices. The automation command may also include commands to the controller to add, configure or modify one or more controller automation devices.

The method may further include sending the automation command to the automation device. The method may additionally include establishing a channel to the client device based on a JSON Web Token (JWT), and receiving a command message from the client device via the cloud server that results in updates sent back to the client device. The method may also include, receiving a command complete message from the automation device, and forwarding the command complete message to the cloud server to be further relayed to the client device.

A method for providing secure remote access by a client device is also described. The method includes establishing a link through a security service to a client device via a cloud server based on a security token from the client device. The method also includes sending a command message for an application program interface (API) located within the controller. The command message is forwarded by the cloud server. The API of the controller interprets the command message to produce an automation command.

Establishing the link through the security service to the controller may include sending a JSON Web Token (JWT) that is forwarded by the cloud server to the controller. The cloud server may forward the command message to the controller using a reflector service. The method may further include sending the security token to the cloud server. The cloud server may validate the security token and create a session for the client device and the controller.

The automation command may include one or more configuration settings that affect one or more controlled automation devices. The automation command may also include commands to the controller to add, configure or modify one or more controlled automation devices.

The method may additionally include receiving a command complete message from the controller that is forwarded by the cloud server to the client device. The method may also include establishing a channel to the controller based on a JSON Web Token (JWT), and sending a command message to the controller via the cloud server that results in updates sent back to the client device.

A controller configured for providing secure remote access is also described. The controller includes a processor. The controller also includes memory in electronic communication with the processor. Instructions stored in the memory are executable to establish a link through a security service to a client device via a cloud server based on a security token from the client device. The instructions are also executable to receive a command message from the client device for an application program interface (API) located within the controller. The command message is forwarded by the cloud server. The instructions are further executable to produce an automation command based on the command message. The API interprets the command message.

A client device configured for providing secure remote access is also described. The client device includes a processor. The client device also includes memory in electronic communication with the processor. Instructions stored in the memory are executable to establish a link through a security service to a controller via a cloud server based on a security token from the client device. The instructions are also executable to send a command message for an application program interface (API) located within the controller. The API interprets the command message to produce an automation command.

Control systems may be used to manage and automate lighting, music, video, security and other control systems in a premise (e.g., homes, businesses and residences, etc.). Secure remote access for control systems may provide an end-user the ability to easily access a control system from a client device (e.g., personal computers and mobile devices) from outside the premises while preventing unauthorized access to those same control systems.

There is a need for secure remote access to control systems to serve a large and growing community of end-users. The end-users may be geographically separated from the one or more controllers that they want to access. In addition, a communications mechanism may need to securely negotiate through end-user network security (e.g., firewalls) without end-user configuration.

Remote access to control systems has traditionally been accomplished using virtual private network (VPN) connections, port forwarding, static internet protocol (IP) addresses and/or dynamic domain name system (DDNS). These approaches are problematic. For example, these approaches may require providing an installer access to the end-user's home to configure the home's router. Additionally, these approaches involve opening ports on the end-user's router, which introduces security risks to the home owner.

The systems and methods disclosed herein may be used to provide secure remote access to a controller. When the controller is installed, it may be given credentials that may be used for remote access. Upon controller startup, an application programming interface (API) on the controller may use a communication network (e.g., the Internet), that provides the controller the ability to discover appropriate endpoints for various services. The controller may use the address server information (e.g., the endpoint information) to contact an authentication service in order to be authenticated on the network.

When a remote user attempts to connect to the controller using a client device, the client device may use a communication infrastructure (e.g., cellular phone network, Internet, etc.) to reach the address server, which may provide endpoint information for various services. The client device may connect to the connection service, which may notify the controller about an inbound session request.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram of a system 100 for providing secure remote access by a controller 102, a cloud server 114 and a client device 120. The system 100 may include one or more automation device(s) 110, the controller 102, a security service 112, a cloud server 114, an address server 118 and the client device 120. Examples of a client device 120 that may utilize the systems and methods disclosed herein include desktop computers, laptop computers, tablet devices, netbooks, cellular phones, smart phones, Personal Digital Assistants (PDAs), etc. For example, an end-user may desire to connect to a home automation system from a remote location with a client device 120. Through the systems and methods disclosed herein, the client device 120 may securely access the controller 102 from a remote location.

As used herein, the term "automation" may refer to controlling a device (by means of a controller 102, for instance). For example, in the context of home automation, one or more controllers 102 may control one or more automation devices 110, which may perform an automation task. Examples of automation tasks include adjusting lighting, operating and monitoring security systems, controlling heating and air conditioning, scheduling and operating water sprinkling, adjusting window coverings, controlling entertainment devices and controlling food preparation appliances, etc. Examples of the one or more automation devices 110 include lights and/or lighting systems, thermostats, audio systems, security cameras, web cameras, sprinkling systems, security systems, televisions, game consoles, computers, etc. In some configurations, the controller 102 and the one or more automation devices 110 may comprise client devices in electronic communication over a network.

The client device 120 may remotely access the controller 102 using the cloud server 114. The cloud server 114 may be a server that is located physically in a remote location. The cloud server 114 may be able to communicate with a client device 120 through different networks (e.g., cellular network, local area network, wide area network). The cloud server 114 may provide accessibility for the client device 120 to software programs or information stored on remotely located devices. In one configuration, many services may be running on a particular cloud server 114, such as a REST forwarder service; a TURN service; a Web Services API which issues JWT tokens. In another configuration, the services may all be running on separate servers.

The cloud server 114 may forward a command message 128 from a user to the controller 102. The controller 102 may produce an automation command 109 based on the command message 128. The command messages 128 sent to the controller 102 may include configuration settings that affect controlled automation devices 110, or commands to the controller 102 to add new automation devices 110 that are to be controlled.

Automation commands 109 may be directed to the controller 102 to configure the automation device 110 network or receive updates on the status of automation devices 110 on the device network. An example of this would be changing the ZIGBEE (e.g., according to technical specification IEEE 802.15.4) channel to reduce interference.

The client device 120 may be remotely located from the controller 102. The controller 102 may be located behind the security service 112 (e.g., a firewall, a NAT or an inbound access server). In some approaches, the client device 120 may use an application programming interface (API) located within the cloud server 114 to achieve a link between the client device 120 and the controller 102. An API may provide a standard method of communication between multiple programs. The standard method of communication may be determined by an industry or may be specific to a single user. An API may allow programs operating on different platforms or languages to communicate and transfer information between the programs. For example, a HTML enabled webpage may communicate with a JavaScript enabled webpage using an API. Having a standard API allows these webpages to transfer information despite being programmed with different protocols.

In the approach where the API is located on the cloud server 114, the client device 120 may be linked to the API and the controller 102 may also be linked to the API. However, having two separate links may cause delays in communication and other processing problems. Also, having two separate links may allow one link to fail and the device on the other link may not be notified in a timely manner. For example, the client device 120 may be a battery powered smart phone. If the battery runs out of power on the smart phone the link between the smart phone and the API may be broken, the link between the controller 102 and the API may continue for a period time consuming bandwidth and power of both the controller 102 and the cloud server 114.

A direct link between the client device 120 and the controller 102 may be more efficient and reduce the chance of errors occurring during communication. A direct link may be achieved by including the API 108 in the controller 102 and using a reflector service 116 on the cloud server 114. The link between the client device 120, cloud server 114 and the controller 102 may be established based on a security token 124 sent by the client device 120.

The security token 124 may allow the link to traverse the security service 112. For example, the cloud server 114 may validate the security token 124 and create a session for the client device 120 and the controller 102. It should be noted that a web service may issue JSON Web Token (JWT) given proper credentials. The JWT itself can be validated independently of a cloud server if the correct public key is present where it is being validated.

The client device 120 may send a command message 128 for the API 108 located within the controller 102 to the cloud server 114. The cloud server 114 may forward the command message 128 through the security service 112 to the API 108 located within the controller 102. The controller 102 may then produce an automation command 109 using the API 108 to interpret the command message 128. In one scenario, an automation command 109 may be sent by the automation module 106 located within the controller 102 to one or more automation devices 110.

The command message 128 may include instructions that may be implemented by the controller 102. For example, the command message 128 may instruct the controller 102 to initiate one or more automation tasks (e.g., change the temperature of the home, turn off the lights, arm a security system, etc.). Additionally or alternatively, the command message 128 may request information from the one or more automation device(s) 110 (e.g., security system status, security camera feed, current thermostat setting, energy consumption, lighting system status, sprinkling system schedule, etc.). It will be appreciated that messages may also be sent from the controller 102 to the client device 120. For example, the client device 120 may receive messages from the controller 102 in response to the command message 128.

The command message 128 may be formatted for the API 108 of the controller 102. The API 108 may implement a number of automation commands 109. For example, the API 108 may coordinate automation devices 110, configure automation devices 110, produce status information, reorganize automation devices 110 within the logical representation of a home, connect automation devices 110 to each other, provide/implement subscriptions to updates, and so on.

In the systems and methods disclosed herein, the client device 120 may include a startup module 122, the security token 124, and an automation application 126. In one configuration, the startup module 122 may be used to request addresses of other devices located within the system 100 directly from the address server 118. In another configuration, the startup module 122 may be used to request addresses of other devices located within the system 100 from the address server 118 via the cloud server 114.

The address server 118 may store, organize and provide a centralized directory for devices (e.g., the controller 102 and/or the client device 120) to look up (e.g., receive) information on the one or more services provided by another device. This information may include, for example, IP addresses, port numbers, host names and/or domain names associated with an endpoint, protocols and address types that may enable a client to establish a communication link with the device.

The security token 124 may be used to traverse the security service 112 to create the link between the client device 120 and the controller 102. The client device 120 may send the security token 124 to the cloud server 114 to allow the cloud server 114 to traverse the security service 112 and allow the client device 120 to communicate with the controller 102 through the security service 112.

The automation application 126 may include hardware and/or software that may enable communication with the controller 102. For example, the client device 120 may be a smart phone that includes an automation application 126 as an executable program. An end-user may run the automation application 126, which may utilize the hardware of the client device 120 (e.g., cellular network hardware, wireless network hardware, etc.) to access the network. Another example of the client device 120 is a laptop that may access the Internet through a wireless (e.g., Wi-Fi) network connection and on which the automation application 126 may be run.

The cloud server 114 may include a reflector service 116. The reflector service 116 may also be referred to as a "Representational State Transfer (REST) Reflector/Forwarder," or simply "reflector." The cloud server 114 may establish a link with the controller 102 by forwarding the security token 124 sent by the client device 120. For example, the security token 124 may be a JWT that is used to direct a request received by the reflector (e.g., reflector service 116) to the controller 102 referenced in the validated JWT. The reflector service 116 may forward a command message 128 from the client device 120 to the API 108 located within the controller 102. One example of a reflector service 116 may be a Representational State Transfer (REST) forwarder.

The controller 102 may access the address server 118 to establish a link with the cloud server 114. For example, the controller 102 may access the address server 118 using an IP address for the address server 118. In one implementation, the address server 118 IP address may be preconfigured on the controller 102 during installation. Alternatively, the controller 102 may be programmed to search the network for an updated address server 118 IP address. The client device 120 may then establish its own link to the reflector service 116. The reflector service 116 may use the address server 118 to complete the link back to the controller 102 using a TURN server, for example.

The controller 102 may establish the link with the cloud server 114 through the security service 112 based on the security token 124 sent by the client device 120.

The controller 102 may include an automation module 106 and the API 108. As used herein, the term "module" may denote an element or entity that may be implemented in software, hardware (e.g., circuitry), firmware or any combination thereof. The API 108 may facilitate secure remote access to the controller 102 as described below. The automation module 106 may perform automation tasks (e.g., send and/or receive automation commands 109 to/from controllable electrical equipment). For example, the automation module 106 may control one or more automation devices 110 (e.g., appliances, other electronic devices, etc.).

The controller 102 may receive the command message 128 for the API 108 that is sent by the client device 120 and forwarded by the reflector service 116. The API 108 may the API 108 may interpret the command message 128 received by the controller 102 to implement a number of automation commands 109. With the API 108 interpreting the command message 128, the client device 120 does not need to know all of the low-level information used to implement an automation command for the one or more automation device (s) 110.

In one configuration, the API 108 may be a RESTful API. A RESTful API may allow web based programs to interact on different devices or via different web-based protocols. The RESTful API allows invoking commands on the controller 102 from any device or software supporting the HTTPS protocol, such as handheld devices, smart TVs, web portals, server-based applications and desktop computers.

As described above, the API 108 may coordinate automation devices 110, configure automation devices 110, produce status information, reorganize automation devices 110 within the logical representation of a home, connect automation devices 110 to each other, provide/implement subscriptions to updates, and so on.

In some implementations, an automation command 109 may implement real-time subscriptions to arbitrary changes in the controller 102 ecosystem. For example, a user of the client device 120 may send a command message 128 to the controller 102 requesting updates to a light state variable on a particular light or any number of lights. The API 108 may interpret the command message 128 to produce an automation command 109 for the update subscription. Based on this automation command 109, the controller 102 may send real-time updates to the client device 120.

In one implementation, the client device 120 may establish a channel to the controller 102 based on a JWT. The client device 120 may send a command message 128, which results in the controller 102 sending update back to the client device 120. This may be accomplished using HTTP long-polling, websockets or any other methodology for a publish-subscribe (Pub/Sub) architecture.

In one case, the controller 102 may implement the automation command 109. In another case, the controller 102 may send the automation command 109 to one or more automation device(s) 110, which may implement the automation command 109.

The controller 102 may send the automation command 109 to the one or more automation device(s) 110 through the automation module 106. Upon receiving the automation command 109, the one or more automation device(s) 110 may perform an automation task. Additionally, the automation command 109 may provide instructions for one or more automation tasks to be performed by the one or more automation device(s) 110 at the current time and/or at a later time. The one or more automation device(s) 110 may further include programming functionality, which may enable the one or more automation device(s) 110 to store and execute data and instructions.

Additionally or alternatively, the one or more automation device(s) 110 may send one or more messages to the automation module 106 located within the controller 102. For example, the automation device 110 may send a response message to the controller 102. In some configurations and/or instances, the response message may provide data and/or indicate the status of the one or more automation device(s) 110. The response message may be issued upon receipt of an automation command 109. The one or more automation device(s) 110 may also periodically and/or independently issue one or more response messages (e.g., to inform the controller 102 of the status of the automation device 110). After completing an automation task, the one or more automation device(s) 110 may send a command complete message to the automation module 106 located within the controller 102. The API 108 located within the controller 102 may interpret the command complete message. The controller 102 may send the command complete message to the cloud server 114. The cloud server 114 may forward the command complete message to the client device 120.

The controller 102, cloud server 114, the client device 120 and/or the one or more automation device(s) 110 may include communication functionality that may enable each to communicate over a network. Examples of the network may include local area networks (LANs), storage area networks (SANs), metropolitan area networks (MANs), wide area networks (WANs) or combinations thereof (e.g., the Internet). In some configurations, the controller 102 and the one or more automation device(s) 110 may not reside at the same physical location, within the same network segment, or even within the same network. In other configurations, the controller 102 and the one or more automation device(s) 110 may be located at the same physical location (e.g., within a home), within the same network segment, or even within the same network. Thus, for example, some devices (e.g., the controller 102 and the one or more automation device(s) 110) may reside at the same physical location (e.g., within a home, business, building, plot, etc.), but other devices (e.g., the client device 120) may not reside in the same physical location.

A variety of different network configurations and/or protocols may be used by the controller 102, the client device 120 and/or the one or more automation device(s) 110, including Ethernet, transmission control protocol/Internet protocol (TCP/IP), user datagram protocol/IP (UDP/IP), Institute of Electrical and Electronics Engineers (IEEE) 802.11, IEEE 802.16, session initiation protocol (SIP), a short range wireless communication protocol (e.g., BLUETOOTH, ZIGBEE (IEEE 802.15.4), Z-WAVE, etc.), wireless networks (e.g., wireless telephone/data network) and/or proprietary formulas and so forth, including combinations thereof.

Figure 2:
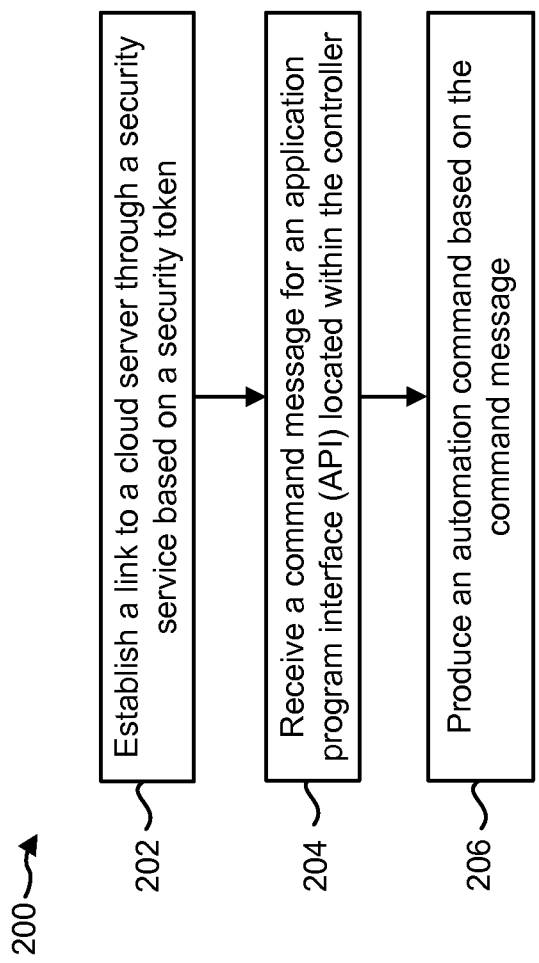
FIG. 2 is a flow diagram illustrating one configuration of a method for providing secure remote access by a controller.

FIG. 2 is a flow diagram illustrating one configuration of a method 200 for providing secure remote access by a controller 102. The controller 102 may establish 202 a link through a security service 112 to a controller 102 via a cloud server 114 based on a security token 124 from the client device 120. The security token 124 may be used to traverse the security service 112 and allow the controller 102 to communicate with the cloud server 114. For example, the cloud server 114 may validate the security token 124 and create a session for the client device 120 and the controller 102.

In one configuration, the controller 102 may establish 202 a link an address server 118. The client device 120 then establishes its own link to the reflector service 116. The reflector service 116 may use the address server 118 to complete the link back to the controller 102, in this case, via a TURN server.

The controller 102 may receive 204 a command message 128 for an API 108 located within the controller 102. The command message 128 may be forwarded by a reflector service 116 located within the cloud server 114. The command message 128 may be processed by the API 108. The command message 128 may include instructions that may be implemented by the controller 102. The command message 128 may include an automation task for one or more automation device(s) 110 that are in communication with the controller 102.

The controller 102 may produce 206 an automation command 109 based on the command message 128. The controller 102 may produce 206 the automation command 109 using an API 108 based on the instructions included in the command message 128. The automation command 109 may include configuration settings that affect controlled automation devices 110, or commands to the controller 102 to add, configure or modify automation devices 110 which are to be controlled.

In one implementation, the controller 102 may send the automation command 109 to one or more automation device(s) 110. The automation command 109 may provide instructions for one or more automation tasks to be performed by the one or more automation device(s) 110. The automation command 109 may indicate a time (e.g., current time and/or later time) at which the automation task is to be executed by an automation device 110.

Figure 3:
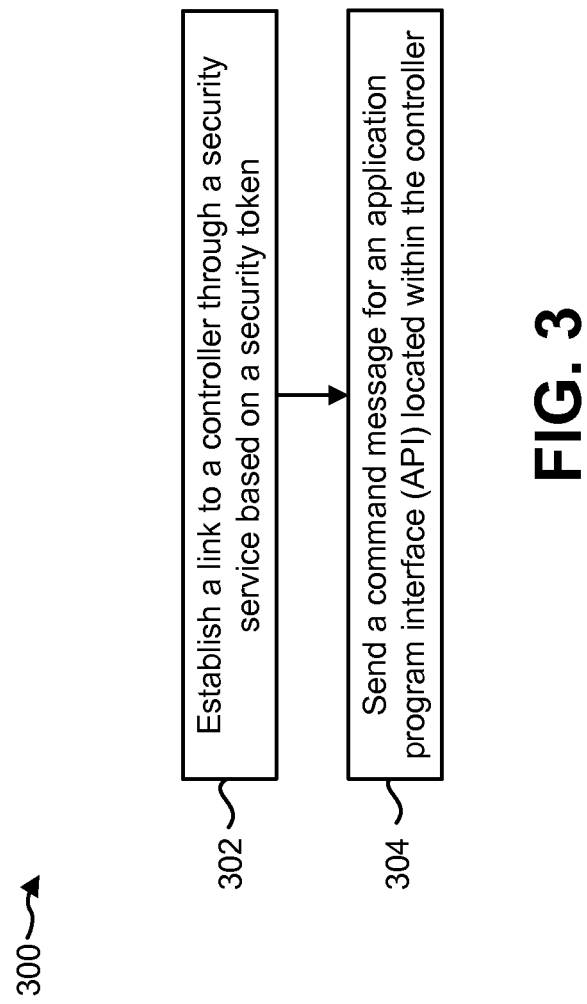
FIG. 3 is a flow diagram illustrating one configuration of a method for providing secure remote access by a client device.

FIG. 3 is a flow diagram illustrating one configuration of a method 300 for providing secure remote access by a client device 120. The client device 120 may establish 302 a link through a security service 112 to a controller 102 via a cloud server 114. The cloud server 114 may receive the security token 124 from a client device 120. The cloud server 114 may validate the security token 124 and create a session for the client device 120 and the controller 102. The cloud server 114 may forward the security token 124 to the security service 112 using a reflector service 116. In one configuration, the reflector service 116 may be a REST forwarder. The security token 124 may be used to traverse the security service 112 and allow the client device 120 to communicate with the controller 102 through the security service 112.

The client device 120 may send 304 a command message 128 for an API 108 located within the controller 102. The cloud server 114 may forward the command message 128 to the controller 102. In one implementation, upon receiving the command message 128 from the client device 120, the reflector service 116 located within the cloud server 114 may send 304 the command message 128 to the controller 102. The controller 102 may provide the command message 128 to the API 108 located within the controller 102.

The API 108 may interpret the command message 128 to produce an automation command 109. In one implementation, the controller 102 may send the automation command 109 to the automation device 110 to implement. In another implementation, the automation command 109 may include instructions that may be implemented by the controller 102. The API 108 may provide a communication link that appears to be directly between the client device 120 and the controller 102.

Figure 4:
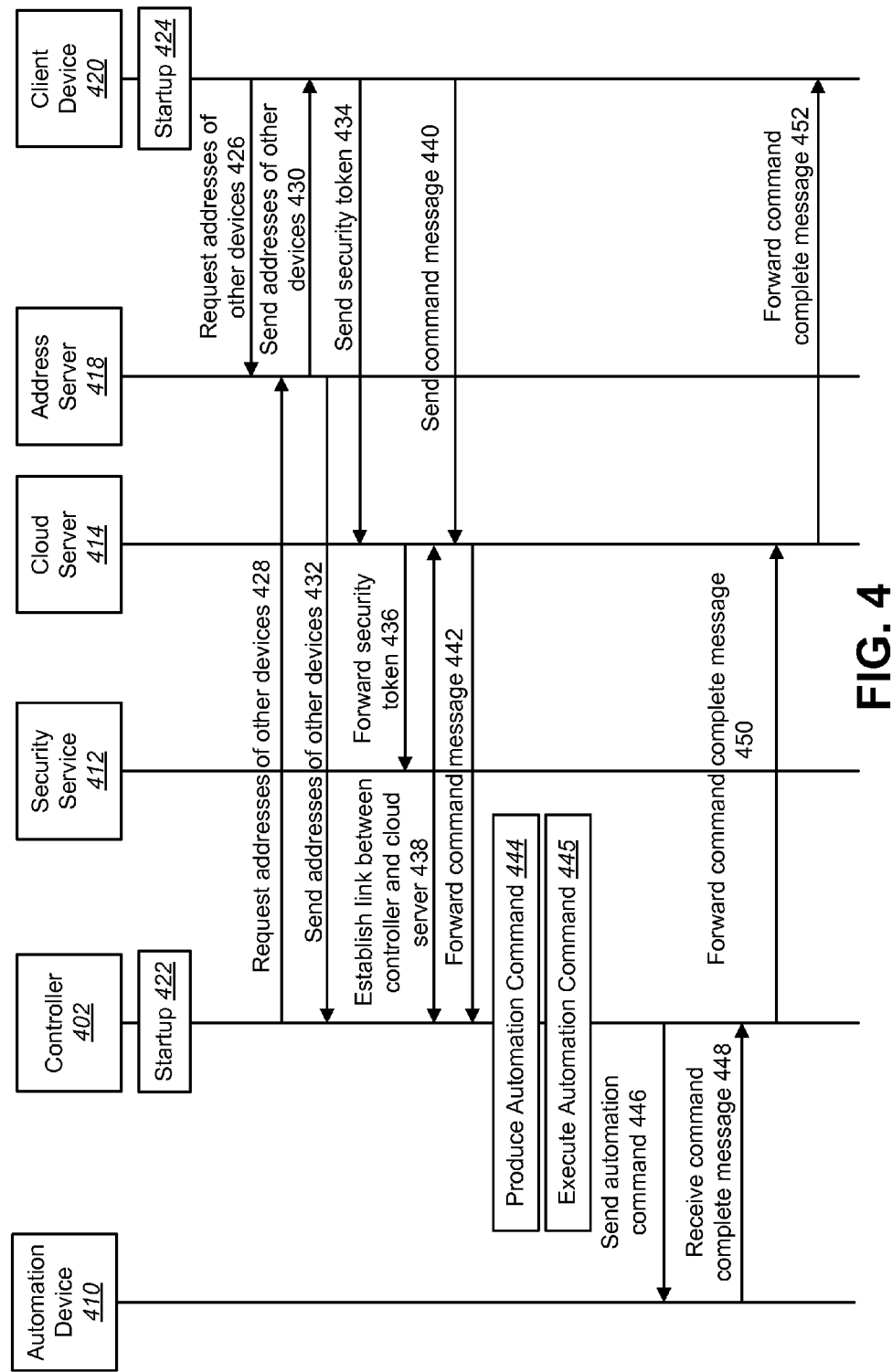
FIG. 4 is a call flow diagram illustrating one configuration of a sequence of events in which systems and methods for providing secure remote access may be implemented.

FIG. 4 is a call flow diagram illustrating one configuration of a sequence of events in which systems and methods for providing secure remote access may be implemented. The system may include an automation device 410, a controller 402, a security service 412, a cloud server 414, an address server 418 and a client device 420. The controller 402 may startup 422, which may be due to a power cycle, initial power up, etc. The client device 420 may also startup 424 due to a power cycle, initial power up, etc.

As part of the startup process, the client device 420 may request 426 address of other devices located within the system. The addresses of other devices may be stored on an address server 118 and may be accessible through the cloud server 414 or may be directly accessible by the client device 420 and controller 402. The controller 402, as part of its startup, may also request 428 the addresses of other devices located within the system. The address server 418 may send 430 the addresses of other devices located within the system to the client device 420. The address server 418 may also send 432 the addresses of the other devices to the controller 402.

The client device 420 may send 434 a security token 124 to the cloud server 414. The cloud server 414 may validate the security token 124 and create a session for the client device 420 and the controller 402. The cloud server 414 may forward 436 the security token 124 to the security service 412 to traverse the security service 412. A link may be established 438 between the controller 402 and the cloud server 414.

The client device 420 may send 440 a command message 128 to the cloud server 414. The command message 128 may be forwarded 442 by the cloud server 414 by a reflector service 116 to the controller 402 through the security service 412.

The command message 128 may include instructions that are implemented by the controller 402. For example, the command message 128 may instruct the controller 402 to initiate one or more automation tasks (e.g., change the temperature of the home, turn off the lights, arm a security system, etc.). Additionally or alternatively, the command message 128 may request information from the controller 402 (e.g., security system status, security camera feed, current thermostat setting, energy consumption, lighting system status, sprinkling system schedule, etc.).

The API 108 located within the controller 402 may process the command message 128 received by the controller 402. The API 108 may produce 444 the automation command 109. In one implementation, the controller 402 may execute 445 the automation command 109. Additionally or alternatively, the controller 402 may send 446 the automation command 109 to one or more automation device(s) 410. The one or more automation device(s) 410 may perform the automation task included in the automation command 109.

A command complete message from the one or more automation device(s) 410 may be received 448 by the controller 402. The controller 402 may forward 450 the command complete message to the cloud server 414 through the security service 412. The cloud server 414 may forward 452 the command complete message to the client device 420 by using the reflector service 116.

Figure 5:
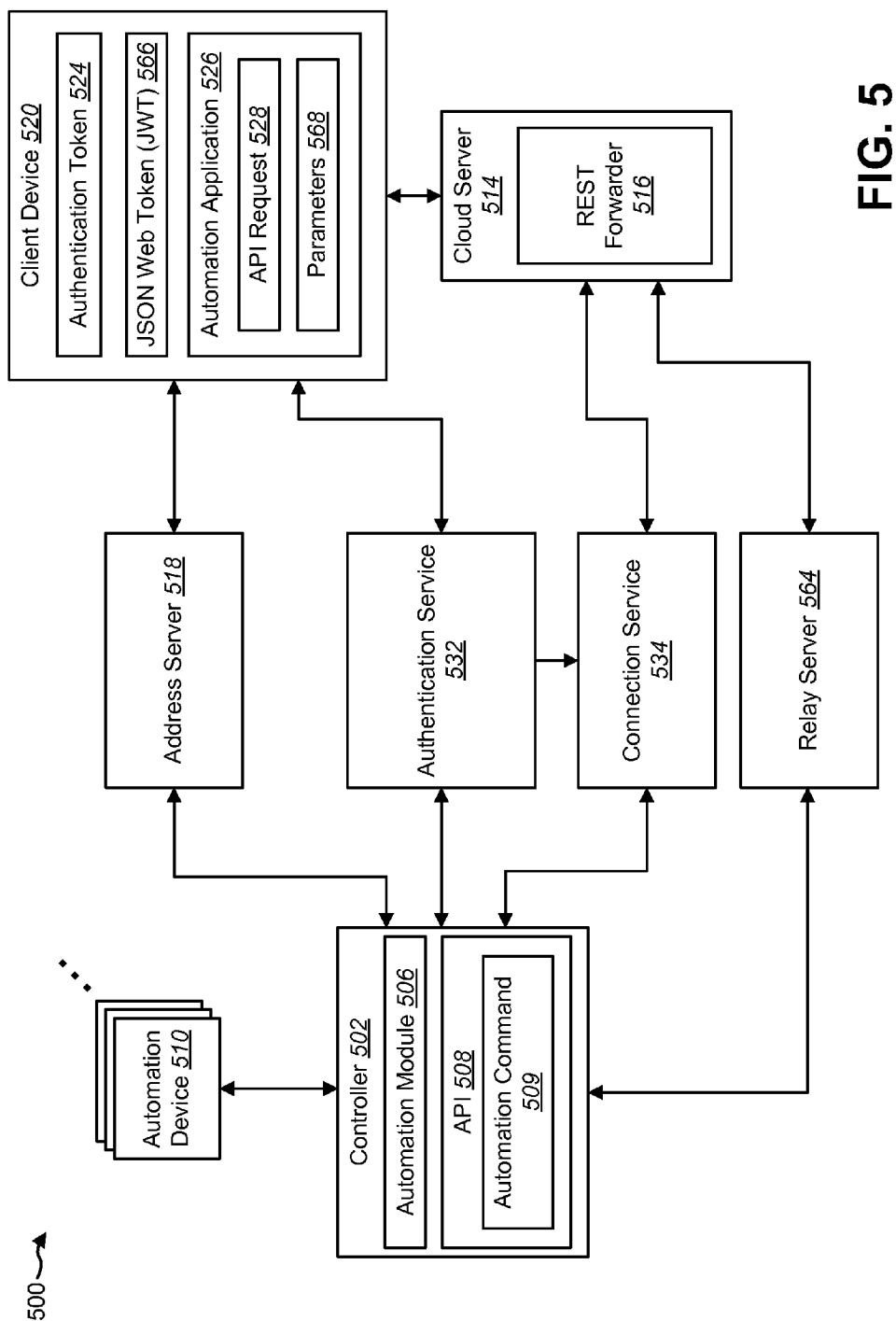
FIG. 5 is a block diagram illustrating another configuration of a system for providing secure remote access.

FIG. 5 is a block diagram illustrating another configuration of a system 500 for providing secure remote access. The system 500 may include one or more of a client device 520, controller 502 and a cloud server 514 that may establish a link for performing automation tasks for one or more automation devices 510. The system 500 may also include one or more of an address server 518, an authentication service 532, a connection service 534 and a relay server 564.

The client device 520 may be an electronic device that runs software that makes remote API calls. For example, the client device 520 may be a smartphone or other device that includes an automation application 526 for performing automation tasks with an automation device 510. The automation application 526 may be configured to generate an API request 528.

The controller 502 may include an automation module 506 and an API 508. The automation module 506 may perform automation tasks. For example, the automation module 506 may execute an automation command at the controller 502. The automation module 506 may additionally or alternatively, send and/or receive automation commands 509 produced by the API 508 to/from one or more automation devices 510 based on an API request 528 sent by the client device 520. Examples of automation tasks include adjusting lighting, operating and monitoring security systems, controlling heating and air conditioning, scheduling and operating water sprinkling, adjusting window coverings, controlling entertainment devices and controlling food preparation appliances, etc.

The cloud server 514 may be a server that is physically located in a remote location from the client device 520 and controller 502. The cloud server 514 may be able to communicate with a client device 520 through different networks (e.g., cellular network, local area network, wide area network). The cloud server 514 may provide accessibility for the client device 520 to software programs or information stored on remotely located devices.

The cloud server 514 may include a REST forwarder 516. The REST forwarder 516 may also be referred to as a REST reflector/forwarder. The REST forwarder 516 may be a proxy service that forwards remote API calls from the client device 520 to the controller 502.

A variety of different network configurations and/or protocols may be used by the controller 502, the cloud server 514 and client device 520, including Ethernet, transmission control protocol/Internet protocol (TCP/IP), user datagram protocol/IP (UDP/IP), Institute of Electrical and Electronics Engineers (IEEE) 802.11, IEEE 802.16, session initiation protocol (SIP), a short range wireless communication protocol (e.g., BLUETOOTH, ZIGBEE (IEEE 802.15.4), Z-WAVE, etc.), wireless networks (e.g., wireless telephone/data network) and/or proprietary formulas and so forth, including combinations thereof.

The controller 502, the cloud server 514 and client device 520 may communicate with one or more services. One example of a service may be a web service. A service may, for instance, comprise software that enables interoperation over a network. For example, a service may interact with the controller 502, the cloud server 514 and/or client device 520 over a network. One or more services may be implemented on one or more servers that may be in communication with the controller 502, the cloud server 514 and/or client device 520 over a network. Furthermore, a service may provide one or more functions to the controller 502, the cloud server 514 or client device 520. Examples of services may include the address server 518, the authentication service 532, the connection service 534 and the relay server 564. The controller 502, the cloud server 514 and client device 520 may communicate with a service over a network using one or more communication protocols (e.g., TCP/IP, hypertext transfer protocol (HTTP), SIP, etc.).

The controller 502, the cloud server 514 and client device 520 may communicate with the address server 518 to obtain endpoint information for one or more services. The address server 518 may include a centralized directory of addresses of other devices and services located within the system 500. Additionally, the address server 518 may include listings of unauthenticated and authenticated devices, which may allow limiting (by the address server 518, for example) exposure of the services only to authenticated clients. For example, the address server 518 may allow a device to lookup other devices based on a set of rules in order for the address server 518 to return other devices that are appropriate for the device to use. For instance, these rules may include whether or not the device is authenticated and authorized to use one or more services, multitenant-specific services, the type of device making the endpoint request and/or the protocol used to access services (e.g., Representational State Transfer (REST)ful versus Simple Object Access Protocol (SOAP), etc.).

In one configuration, the address server 518 may be an entry point for devices to discover available services and receive endpoint information to communicate with those services. For example, an unauthenticated device calling (e.g., communicating with) the address server 518 may only receive authentication service endpoint information (initially, for instance). Once the device has successfully authenticated, a second call to the address server 518 may return a list of available services (e.g., the connection service 534, an account service, a relay server 564, a Traversal Using Relays around Network Address Translation (NAT) (TURN) server, etc.) with which the device may communicate.

It should be noted that the functions of the REST forwarder 516 and the relay server 564 could reside within the same service on the same server (e.g., cloud server 514) or in separate services or in separate servers. The separation of a relay server 564, as illustrated, is one implementation. In another implementation, the REST forwarder 516 could be a front end on the relay server 564 and may not be a separate entity.

The client device 520 may connect to the address server 518. For example, the client device 520 may use an IP address for the address server 518 that may be preconfigured on the client device 520 during installation. Alternatively, the client device 520 may be programmed to search the network for an updated address server IP address. Upon connecting to the address server 518, the client device 520 may send one or more requests for the addresses of other devices to the address server 518. The address server 518 may send address information, which may include IP addresses, port numbers, protocols and address types (e.g., host, relay, server reflexive, etc.) with which the client device 520 may attempt to establish a link with the controller 502.

The client device 520 may discover the authentication service 532 from the address server 518. The client device 520 may contact the authentication service 532 to be authenticated on the network. The authentication service 532 may comprise a service with which the client device 520 may communicate over the network using a communication protocol.

The authentication service 532 may authenticate the client device 520 based on credentials. In one configuration, a username and password may be entered into a hosted login screen. In another configuration, privileged applications on the client device 520 (e.g., the automation application 526) may accept a username and password within the application and may pass these credentials to the authentication service 532. The authentication service 532 may return an authentication token 524 to the client device 520 if the credentials are successfully authenticated.

The authentication service 532 may authorize the client device 520. The client device 520 may request authorization to the controller 502 by passing the authorization token 524 to the authentication service 532. The authentication service 532 may perform authorization checks ensuring that the user associated with the authentication token 524 has permissions to access the controller 502. The authentication service 532 may generate a JSON Web Token (JWT) 566 that includes application and user permissions. The authentication service 532 may sign the JWT 566 with a private key and may append the signature to the JWT 566. The authentication service 532 may return JWT 566 to the client device 520. It should be noted that the authentication service 532 may combine the authentication and authorization processes into a single process resulting in a JWT 566 being returned to the client device 520.

The controller 502 may contact the connection service 534 in order to register the location of the controller 502. The connection service 534 may comprise a service with which the controller 502 may communicate over the network using a communication protocol. The connection service 534 may negotiate a link between the controller 502 and the cloud server 514.

In one configuration, the connection service 534 communicates with devices (e.g., the controller 502, the cloud server 514 and client device 520) using a Session Initiation Protocol (SIP), which is an Internet Engineering Task Force (IETF) protocol. The SIP may be used for initiating communication sessions between the client device 520, cloud server 514 and the controller 502, for example.

SIP is an application-layer control (signaling) protocol for creating, modifying and terminating sessions with one or more participants. Parameters (e.g., port numbers, protocols, etc.) for the SIP communication may be defined and negotiated using the Session Description Protocol (SDP), which may be transported in an SIP packet body. SDP is an acronym for Session Description Protocol, which may be used to describe the format of endpoint messages. For example, SDP may describe multimedia sessions for the purposes of session announcement, session invitation and other forms of multimedia session initiation. The SIP messages used to create sessions may carry session descriptions that may allow participants to agree on a set of compatible media types. These session descriptions may be formatted using SDP. Both of these protocols (SIP and SDP) may be used to set up the final link from the cloud server 514 and the controller 502. The combination of SIP/SDP may facilitate the establishment of a secure link for communicating command messages.

The controller 502 may register with the connection service 534 by sending the internal and external IP addresses of the controller 502. The connection service 534 may register the location of the controller 502 for future sessions with the cloud server 514 and client device 520. In one configuration, the controller 502 periodically reregisters (e.g., every three minutes) with the connection service 534 in order to keep the connection to the connection service 534 alive and traceable back to the controller 502. By registering with the connection service 534, the controller 502 may traverse the network address translations (NATs), thereby increasing network security by avoiding port forwarding and VPN connections in order to traverse the NATs.

The client device 520 may make a remote API call. The client device 520 may discover the REST forwarder 516 endpoint from the address server 518. The client device 520 may make an API call by sending an API request 528, parameters 568 and the JWT 566 to the REST forwarder 516. The REST forwarder 516 may validate the JWT 566 signature using an authorization/security public key. The REST forwarder 516 may inspect the JWT 566 ensuring that the client device 520 has remote access permissions. If the client device 520 does not have remote access permissions, the REST forwarder 516 may return a "403 NOT AUTHORIZED" message to the client device 520.

The REST forwarder 516 may determine whether the client device 520 has an existing session. If not, a session is created and a worker pool may be associated with the session. Each worker processor in the worker pool may initiate a remote connection to the controller 502 by sending a SIP INVITE message to the connection service 534. The connection service 534 may forward the SIP INVITE message to the controller 502. The controller 502 may allocate a port on the relay server 564 and applies security permissions. The controller 502 may return the relay server 564 IP address and port in an INVITE ANSWER message to the connection service 534. The connection service 534 returns the INVITE ANSWER message to the REST forwarder 516.

The REST forwarder 516 may retrieve an available worker from the session worker pool using the API request 528, parameters 568 and JWT 566. A worker sends the API request 528 and the JWT 566 to the controller 502 through the pre-allocated relay server 564 IP and port.

The relay server 564 may forward/relay the packet(s) from the worker to the controller 502. The controller 502 may validate the JWT 566 with an authorization/security public key. The controller 502 may inspect the JWT 566 ensuring the client device 520 has appropriate permission levels to execute the API. If the client device 520 has an invalid permission level, then the controller 502 may return a "403 NOT AUTHORIZED" response. In this case, the call stack unwinds, returning the response to the client device 520 (via the controller 502, relay server 564, REST forwarder 516, client device 520).

If the controller 502 determines that the client device 520 has a valid permission level, the controller 502 may execute the API 508. By executing the API 508, the controller 502 may produce an automation command 509. The controller 502 may then execute the automation command 509 or send the automation command 509 to an automation device 510 where the automation command 509 may be implemented. The controller 502 may return a response to client (e.g., the call stack unwinds: controller 502, relay server 564, REST forwarder 516, client device 520).

FIG. 6 is a block diagram illustrating various components that may be utilized in a controller 602 and/or a client device 620. Although only the controller 602 and/or the client device 620 are shown, the configurations herein may be implemented in a distributed system using many electronic devices. A controller 602 and/or a client device 620 may include a broad range of digital computers, including microcontrollers, hand-held computers, personal computers, servers, mainframes, supercomputers, minicomputers, workstations and any variation or related device thereof. In some configurations, the controller 602 and/or the client device 620 may be appliances. Additionally or alternatively, the controller 602 and/or the client device 620 may be an embedded device inside an otherwise complete device (e.g., within an appliance).

The controller 602 and/or the client device 620 is/are shown with a processor 647 and memory 646. The processor 647 may control the operation of the controller 602 and/or the client device 620 and may be embodied as a microprocessor, a microcontroller, a digital signal processor (DSP) or other device known in the art. The processor 647 typically performs logical and arithmetic operations based on program instructions 648a and/or data 650a stored within the memory 646. The instructions 648a in the memory 646 may be executable to implement the methods described herein. FIG. 6 illustrates instructions 648b and/or data 650b being loaded onto the processor 647. The instructions 648b and/or data 650b may be the instructions 648a and/or data 650a (or portions thereof) stored in memory 646.

The controller 602 and/or the client device 620 may also include one or more communication interfaces 652 and/or network interfaces 658 for communicating with other electronic devices. The communication interface(s) 652 and the network interface(s) 658 may be based on wired communication technology and/or wireless communication technology, such as ZigBee®, WiMax®, WiFi®, Bluetooth® and/or cellular protocols, such as GSM®, etc.

The controller 602 and/or the client device 620 may also include one or more input devices 654 and one or more output devices 660. The input devices 654 and output devices 660 may facilitate user input/user output. Other components 656 may also be provided as part of the controller 602 and/or the client device 620.

Instructions 648a and data 650a may be stored in the memory 646. The processor 647 may load and execute instructions 648b from the instructions 648a in memory 646 to implement various functions. Executing the instructions 648a may involve the use of the data 650a that is stored in the memory 646. The instructions 648b and/or data 650b may be loaded onto the processor 647. The instructions 648 are executable to implement the one or more methods shown herein and the data 650 may include one or more of the various pieces of data described herein.

The memory 646 may be any electronic component capable of storing electronic information. The memory 646 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers and so forth, including combinations thereof. The various components of the controller 602 and/or the client device 620 may be coupled together by a bus system 662, which may include a power bus, a control signal bus and a status signal bus, in addition to a data bus. However, for the sake of clarity, the various buses are illustrated in FIG. 6 as the bus system 662.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for providing secure remote access by a controller, comprising:
    establishing a link from the controller, through a security service and a cloud server, to a client device after the cloud server validates a security token from the client device;
    receiving a command message from the client device for an application programming interface (API) located within the controller, wherein the command message from the client device is forwarded by the cloud server through the security service before it is received at the controller, wherein the cloud server forwards the received command message, through the security service, to the controller using a Representational State Transfer (REST) forwarder; and
    producing an automation command based on the command message, wherein the API interprets the command message.

2. The method of claim 1, wherein establishing the link through the security service to the client device comprises receiving a JSON Web Token (JWT) sent by the client device and forwarded by the cloud server.

3. The method of claim 1, further comprising:
    receiving the security token from the client device via the cloud server; and
    executing the API upon validating the security token.

4. The method of claim 1, wherein the automation command includes one or more configuration settings that changes a channel used by one or more of the controlled automation devices, wherein the channel is defined according to the Institute of Electrical and Electronics Engineers (IEEE) 802.15.4 technical specification.

5. The method of claim 1, wherein the automation command comprises commands to the controller to add, configure or modify one or more controlled automation devices.

6. The method of claim 1, further comprising sending the automation command to an automation device.

7. The method of claim 1, further comprising:
    establishing a channel to the client device based on a JSON Web Token (JWT); and
    receiving a command message from the client device via the cloud server that results in updates sent back to the client device.

8. The method of claim 1, further comprising:
    receiving a command complete message from an automation device; and
    forwarding the command complete message to the cloud server to be further relayed to the client device.

9. A method for providing secure remote access by a client device, comprising:
    establishing a link from the client device, through a security service and a cloud server, to a controller after the cloud server validates a security token from the client device; and
    sending a command message for an application programming interface (API) located within the controller, wherein the command message from the client device is forwarded by a Representational State Transfer (REST) forwarder in the cloud server through the security service before it is received at the controller, and wherein the API of the controller interprets the command message to produce an automation command.

10. The method of claim 9, wherein establishing the link through the security service to the controller comprises sending a JSON Web Token (JWT) that is forwarded by the cloud server to the controller.

11. The method of claim 9, further comprising sending the security token to the cloud server, wherein the cloud server creates a session for the client device and the controller.

12. The method of claim 9, wherein the automation command includes one or more configuration settings that affect one or more controlled automation devices.

13. The method of claim 9, wherein the automation command comprises commands to the controller to add, configure or modify one or more controlled automation devices.

14. The method of claim 9, further comprising receiving a command complete message from the controller that is forwarded by the cloud server to the client device.

15. The method of claim 9, further comprising:
    establishing a channel to the controller based on a JSON Web Token (JWT); and
    sending a command message to the controller via the cloud server that results in updates sent back to the client device.

16. The method of claim 9, further comprising:
    sending a JSON Web Token (JWT) to the REST forwarder in the cloud server; and
    receiving a message from the REST forwarder indicating that the client device is not authorized in response to the REST forwarder inspecting the client and determining that the client device does not have remote access permissions.

17. A controller for providing secure remote access, comprising:
    a processor; and
    memory in electronic communication with the processor, wherein instructions stored in the memory are executable to:
        establish a link from the controller, through a security service and a cloud server, to a client device after the cloud server validates a security token from the client device;
        receive a command message from the client device for an application programming interface (API) located within the controller, wherein the command message from the client device is forwarded by a reflector service in the cloud server through the security service before it is received at the controller, wherein the cloud server forwards the received command message, through the security service, to the controller using a Representational State Transfer (REST) forwarder; and
        produce an automation command based on the command message, wherein the API interprets the command message.

18. The controller of claim 17, wherein the instructions are executable to establish the link through the security service to the client device comprise instructions executable to receive a JSON Web Token (JWT) sent by the client device and forwarded by the cloud server.

19. The controller of claim 17, wherein the automation command includes one or more configuration settings that affect one or more controlled automation devices.

20. The controller of claim 17, wherein the automation command comprises commands to the controller to add, configure or modify one or more controlled automation devices.

21. The controller of claim 17, further comprising instructions executable to:
   establish a channel to the client device based on a JSON Web Token (JWT); and
   receive a command message from the client device via the cloud server that results in updates sent back to the client device.

22. A client device for providing secure remote access, comprising:
   a processor; and
   memory in electronic communication with the processor, wherein instructions stored in the memory are executable to:
      establish a link from the client device, through a security service and a cloud server, to a controller after the cloud server validates a security token from the client device; and
      send a command message for an application programming interface (API) located within the controller, wherein the command message from the client device is forwarded by a Representational State Transfer (REST) forwarder in the cloud server through the security service before it is received at the controller, wherein the API interprets the command message to produce an automation command.

23. The client device of claim 22, wherein the instructions are executable to establish the link through the security service to the controller comprise instructions executable to send a JSON Web Token (JWT) that is forwarded by the cloud server to the controller.

24. The client device of claim 22, wherein the automation command includes one or more configuration settings that affect one or more controlled automation devices.

25. The client device of claim 22, wherein the automation command comprises commands to the controller to add, configure or modify one or more controlled automation devices.

26. The client device of claim 22, further comprising instructions executable to:
   establish a channel to the controller based on a JSON Web Token (JWT); and
   send a command message to the controller via the cloud server that results in updates sent back to the client device.

* * * * *